United States Patent Office 3,282,988
Patented Nov. 1, 1966

3,282,988
PROCESS FOR PRODUCING HALF ESTER ACYL CHLORIDES OF AROMATIC DICARBOXYLIC ACIDS
Gustav Renckhoff and Walter Rudolph, Witten (Ruhr), Germany, assignors to Chemische Werke Witten G.m.b.H., Witten (Ruhr), Germany
No Drawing. Filed Feb. 23, 1962, Ser. No. 175,312
Claims priority, application Germany, Mar. 11, 1961, C 23,620
8 Claims. (Cl. 260—475)

The present invention is directed to a process for the production of half esters acyl chlorides of aromatic dicarboxylic acids and of their nuclear substituted products, especially of isophthalic and terephthalic acids.

It has already been proposed in applicants' copending application, Serial No. 158,878, filed December 12, 1961, that the production of half ester acyl chlorides of aromatic dicarboxylic acids and of their nuclear substitution products, particularly iso- and terephthalic acid, be effected by heating the corresponding trichloromethylbenzoic acid esters of primary alcohols, preferably those having up to 5 carbon atoms, and particularly the methyl ester, with mono-, di-, or trichloroacetic acid in the presence of acid catalysts, preferably iron (III) chloride. The half ester acyl chloride is formed with a yield of above 90% and can be easily separated by distillation from the chloroacetyl chloride, which is also formed. The trichloromethylbenzoic acid esters required as starting material for the reaction are prepared by exhaustive chlorination of the toluic acid methyl ester while exposed to light at a temperature of from 140 to 200° C., and by reaction of the resulting trichloromethylbenzoyl chlorides with a primary alcohol, for example, methanol.

It has now been found that the half ester acyl chlorides of aromatic dicarboxylic acids and their nuclear substitution products, particularly iso- and terephthalic acid, can be prepared particularly advantageously when the trichloromethylbenzoic acid esters of primary alcohols, preferably such having up to 5 carbon atoms, especially the methyl ester, are heated with the corresponding methylbenzoic acids in the presence of small quantities of iron (III) chloride, preferably 0.1%, to higher temperatures, particularly of from 100 to 160° C. and preferably from 120 to 130° C. This reaction will yield in an almost quantitative amount, a mixture of the dicarboxylic acid half ester acyl chloride and methylbenzoic acid chloride, which may be easily separated by distillation.

The methylbenzoic acid chloride can then be easily chlorinated to trichloromethylbenzoyl chloride by exposure to light and at temperatures above 100° C., preferably 150–170° C., and from trichloromethylbenzoyl chloride it is possible to prepare the corresponding trichloromethylbenzoic acid ester by reaction with primary alcohols, preferably methanol; the trichloromethylbenzoic acid ester being again available for the formation of the half ester acyl chloride.

The trichloromethylbenzoic acid esters required as starting material for the reaction proposed by the present invention are available in an excellent yield also from αα'-hexachloroxylenes which are partially saponified to trichloromethylbenzoyl chlorides and converted quantitatively to esters by heating with alcohols.

The trichloromethylbenzoic acid esters can also be prepared particularly advantageously from m- or p-toluic acid methyl ester by exhaustive chlorination under exposure to light and at temperatures above 150° C. to give the trichloromethylbenzoyl chlorides, which may at once be further reacted to esters.

The reaction proposed by the present invention is effected by using equimolecular amounts of trichloromethylbenzoic acid ester and of the corresponding methylbenzoic acid and melting them together while adding thereto a catalyst such as iron (III) chloride and bringing the reaction mixture to the reaction temperature while stirring. The reaction begins above 100° C. with hydrogen chloride being cleaved off. The termination of the reaction, which will generally be achieved within one hour, can easily be recognized by the cessation of gas evolution. Work-up takes place by fractional distillation in vacuo, whereby first methylbenzoic acid chloride and later the half ester acyl chloride distill over.

It is preferable, in order to yield, for example, terephthalic acid half ester acyl chloride from p-trichloromethylbenzoic acid methyl ester, to react p-toluic acid with that ester, since the p-toluic acid chloride formed may be returned to the p-trichloromethylbenzoic acid ester after chlorination to p-trichloromethylbenzoyl chloride by reaction with methanol. Analogously, in order to yield isophthalic acid half ester acyl chloride, m-toluic acid is to be used as the starting material.

The half ester acyl chlorides of aromatic dicarboxylic acids are valuable intermediate products for the production of synthetic materials by polycondensation.

The preferred catalyst is iron (III) chloride; however, as catalysts, coordinately unsaturated, inorganic polyhalogen compounds such as, for example, zinc chloride, aluminum chloride, boron fluoride, antimony pentachloride, and others can be used. These substances are designated as acid-analogous substances, for example, according to the "Lehrbuch der Organischen Chemie" by Klages, volume 2, second edition, page 124. Accordingly, the term "acid catalyst" as used hereinafter is intended to encompass such coordinately unsaturated, inorganic polyhalogen compounds.

It is an object of the present invention, therefore, to provide an improved process for the production of half ester acyl chlorides of aromatic dicarboxylic acids, particularly isophthalic acid and terephthalic acid.

It is a further object of the present invention to provide such a process wherein a product may be easily used as a starting material thereby increasing efficiency, etc.

These and further objects will become obvious from the following further description wherein the examples serve to illustrate the process without, however, limiting the same.

Example I 507 parts by weight of p-trichloromethylbenzoic acid methyl ester and 272 parts by weight of p-toluic acid are heated together, while stirring, to 120° C. while adding thereto 0.77 part by weight equal to 0.1% of iron (III) chloride. The toluic acid melts first in the trichloromethylbenzoic acid ester; a lively hydrogen chloride cleaving action sets in at about 100° C., and the reaction mass becomes temporarily rather thick by separation of a crystalline substance. When heating is continued to 120° C., the separated crystals go back into solution under continued active hydrogen chloride generation. The reaction mixture is clear and homogeneous after about ¾ hour, and the cleaving-off of hydrochloric acid is then complete. The reaction mixture is subsequently subjected to distillation in vacuo at 12 torr. 296 parts by weight, corresponding to 95.7% of the theory, of p-toluic acid chloride distills at from 98 to 100° C. After a short intermediate run, 344 parts by weight, corresponding to 87% of the theory, of terephthalic acid methyl ester chloride distills subsequently at 145° C. (melting point 54° C.).

The resulting 296 parts by weight of p-toluic acid chloride is chlorinated with the addition of 0.2% by weight of lauric acid diethyl amide at 160° C. under exposure to light with a 200 watt lamp by introducing a lively chlorine stream to give an absorption of 3 chlorine atoms.

During the vacuum distillation of the chlorination product, 464 parts by weight, corresponding to 94% of the theory, of p-trichloromethylbenzoyl chloride distills over at 149–150° C. at 10 torr. Said p-trichloromethylbenzoyl chloride may be reacted to p-trichloromethylbenzoic acid methyl ester in a quantitative yield by reaction with excess amounts of methanol at 40–50° C. and again brought to react with p-toluic acid.

*Example II*

507 parts by weight of m-trichloromethylbenzoic acid methyl ester and 272 parts by weight of m-toluic acid are reacted together with the addition of 0.78 part by weight of iron (III) chloride, as described in Example I.

During the distillation in vacuo, 295 parts by weight, corresponding to 95% of the theory, of m-toluic acid chloride is obtained which distills over at 12 torr and at 98–99° C. 345 parts by weight, corresponding to 89% of the theory, isophthalic acid methyl ester chloride distills subsequently at a boiling point of 144–146° C. and at 12 torr.

The chlorination of the m-toluic acid chloride to m-trichloromethylbenzoyl chloride proceeds in a practically quantitative yield in the same manner as described in Example I.

*Example III*

127 parts by weight of p-trichloromethylbenzoic acid methyl ester and 68 parts by weight of p-toluic acid are heated together with stirring while adding thereto 0.2 part by weight, that is 0.1%, of antimony pentachloride. Thereby the toluic acid melts first in the trichloromethylbenzoic acid ester. At approximately 80° C., there is a brisk hydrogen chloride cleavage which is terminated within 30 minutes, during which the reaction temperature is further increased up to 120° C. When distilling the reaction mixture in vacuo at 12 torr, 74 parts by weight, corresponding to 95% of the theory, of p-toluic acid chloride distills over at from 98 to 100° C. After a short intermediate run at 145° C., there subsequently follows 87 parts by weight of terephthalic acid methyl ester chloride having a melting point of 54° C., which corresponds to a yield of 88%.

*Example IV*

134 parts by weight of p-trichloromethylbenzoic acid ethyl ester and 68 parts by weight of p-toluic acid are heated to 150° C. for 1½ hours while stirring and while adding thereof 0.2 part by weight of iron (III) chloride, until the hydrogen chloride cleavage is terminated. By distillation of the reaction mixture, 74 parts by weight, corresponding to 95% of the theory, of p-toluic acid chloride and 87 parts by weight, corresponding to 83% of the theory, of terephthalic acid ethyl ester chloride, having a boiling point of 133–134° C., are obtained at 6 torr and a melting point of 26.5–27° C.

*Example V*

148 parts by weight of p-trichloromethylbenzoic acid butyl ester and 68 parts by weight of p-toluic acid are heated to 170° C. for 3 hours, while stirring and with the addition of 0.2 part by weight of iron (III) chloride until the hydrogen chloride cleavage is terminated. By distillation of the reaction mixture, 72 parts by weight, corresponding to 91% of the theory, of p-toluic acid chloride and 88 parts by weight, corresponding to 73% of the theory, of terephthalic acid butyl ester chloride are obtained. This product has a boiling point of 174–179° C. at 11 torr and a melting point of 12.5–13.5° C.

*Example VI*

144 parts by weight of p-chloro-m-trichloromethylbenzoic acid methyl ester is heated to 120–130° C. for three hours with 85 parts by weight of 4-chloro-3-methylbenzoic acid with the addition of 0.25 part by weight of iron (III) chloride until the formation of hydrogen chloride is terminated. By the subsequent vacuum distillation of the reaction mixture, and after a preliminary run of 81 parts by weight of 4-chloro-3-methylbenzoyl chloride at 18 torr at 178–180° C., 85 parts by weight, corresponding to 75% of the theory, of 4-chloroisophthalic acid methyl ester chloride distills over.

Since certain changes may be made in carrying out the above process without departing from the scope of the invention, it is intended that all matter contained in the above description shall be interpreted as illustrative and not in a limiting sense.

We claim:

1. A process for the production of half ester acyl chlorides of aromatic dicarboxylic acids and the nuclear-chlorine substituted derivatives thereof which comprises heating an ester selected from the group consisting of trichloromethylbenzoic acid esters of primary alcohols containing from 1 to 5 carbon atoms and nuclear-chlorine substituted trichloromethylbenzoic acid esters of primary alcohols containing from 1 to 5 carbon atoms in the presence of a coordinately unsaturated inorganic polyhalogen compound as catalyst with an essentially equimolecular amount of the corresponding methylbenzoic acid at a reaction temperature above approximately 100° C. for a period of time sufficient to produce a reaction mixture containing aromatic dicarboxylic acid half ester acyl chloride and methylbenzoic acid chloride, and thereafter separating the reaction mixture to recover said aromatic dicarboxylic acid half ester acyl chloride and methylbenzoic acid chloride, said reaction temperature being below the decomposition temperature of said aromatic dicarboxylic acid half ester acyl chloride and methylbenzoic acid chloride.

2. A process as defined in claim 1, wherein said reaction mixture is separated by distillation.

3. A process as defined in claim 1, wherein said alcohol is methanol and the reaction mixture is heated to a temperature between approximately 120° and 130° C.

4. A process as defined in claim 1, wherein said coordinately unsaturated inorganic polyhalogen compound is selected from the group consisting of iron (III) chloride, zinc chloride, aluminum chloride, boron fluoride and antimony pentachloride.

5. A process as defined in claim 4, wherein said catalyst is iron (III) chloride.

6. A process for the production of half ester acyl chlorides of aromatic dicarboxylic acids and the nuclear chlorine substituted derivatives thereof which comprises heating an ester selected from the group consisting of trichloromethylbenzoic acid esters of primary alcohols containing from 1 to 5 carbon atoms and nuclear-chlorine substituted trichloromethylbenzoic acid esters of primary alcohols containing from 1 to 5 carbon atoms in the presence of a coordinately unsaturated, inorganic polyhalogen compound as catalyst with an essentially equimolecular amount of the corresponding methylbenzoic acid at a reaction temperature of between approximately 100° and 160° C. for a period of time sufficient to produce a reaction mixture containing aromatic dicarboxylic acid half ester acyl chloride and methylbenzoic acid chloride, and thereafter separating the reaction mixture to recover the resulting aromatic dicarboxylic acid half ester acyl chloride and methylbenzoic acid chloride.

7. A process as defined in claim 6, wherein said ester to be heated is selected from the group consisting of m-trichloromethylbenzoic acid methyl ester and p-trichloromethylbenzoic acid methyl ester.

8. A process for the production of half ester acyl chlorides of aromatic dicarboxylic acids and the nuclear-chlorine substituted derivatives thereof which comprises heating an ester selected from the group consisting of trichloromethylbenzoic acid esters of primary alcohols containing from 1 to 5 carbon atoms and nuclear-chlorine substituted trichloromethylbenzoic acid esters of primary alcohols containing from 1 to 5 carbon atoms with an essentially equimolecular amount of the corresponding methylbenzoic acid at a temperature of between approximately 100° and 160° C. in the presence of about 0.1% by weight of a coordinately unsaturated inorganic polyhalogen compound as catalyst, and separating the resulting aromatic dicarboxylic acid half ester acyl chloride and methylbenzoic acid chloride from the reaction mixture by distillation.

References Cited by the Examiner
UNITED STATES PATENTS

| | | | |
|---|---|---|---|
| 1,880,169 | 9/1932 | Bennett et al. | 260—544 |
| 1,921,767 | 8/1933 | Mills | 260—544 |
| 1,965,556 | 7/1934 | Mills | 260—544 |
| 2,525,723 | 10/1950 | Rabjohn | 260—544 |
| 2,865,959 | 12/1958 | Toland | 260—544 |

OTHER REFERENCES

Fieser et al. "Organic Chemistry," third edition (1956), p. 672.

LORRAINE A. WEINBERGER, *Primary Examiner.*

DUVAL McCUTCHEN, LEON ZITVER,
*Examiners.*

A. D. ROLLINS, R. E. MASSA, T. L. GALLOWAY,
*Assistant Examiners.*